Oct. 13, 1942.    L. BALESTRI    2,298,524
COMBINATION WAGON BOX
Filed June 27, 1941    5 Sheets-Sheet 1
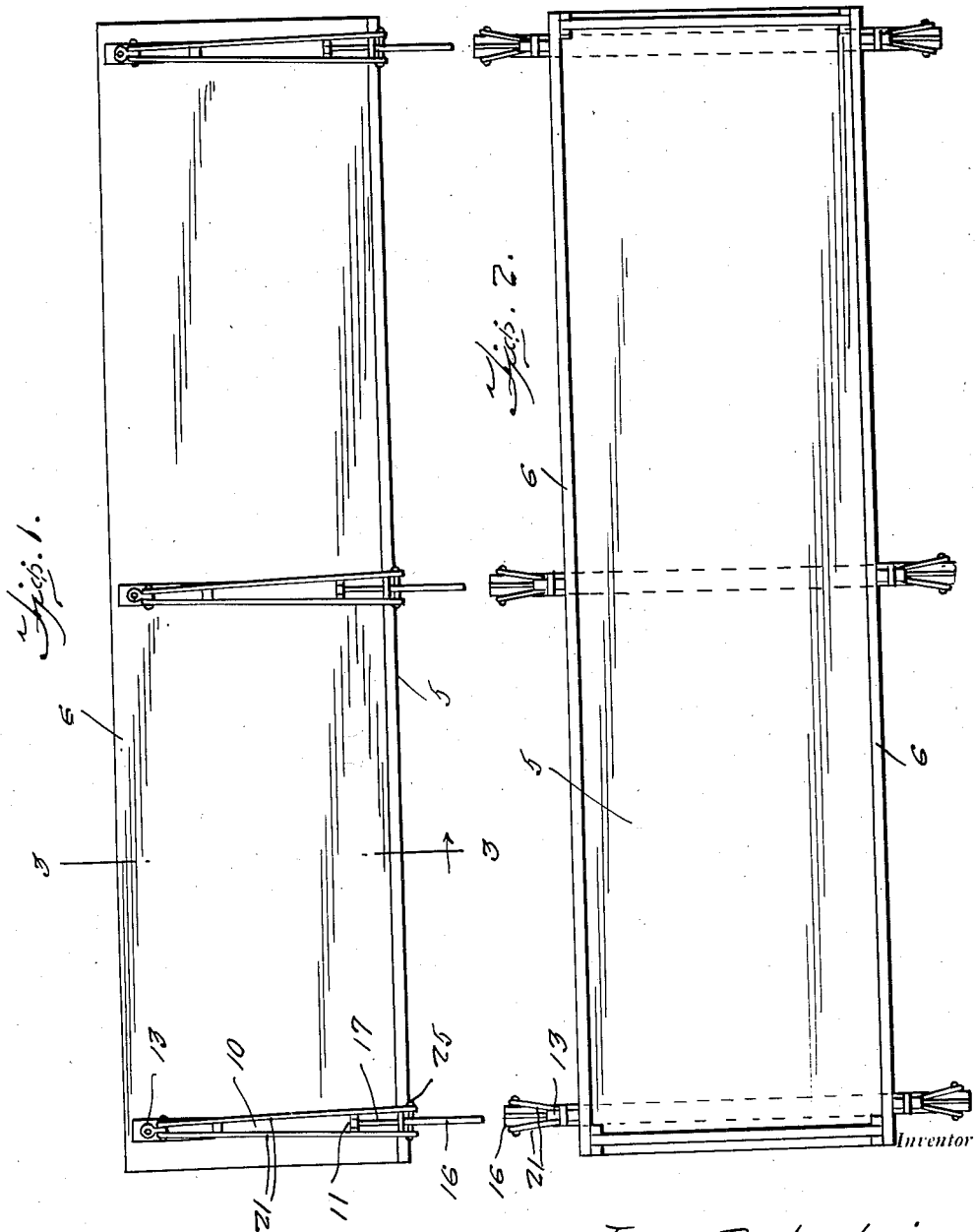
Leon Balestri
By Clarence A. O'Brien
Attorney

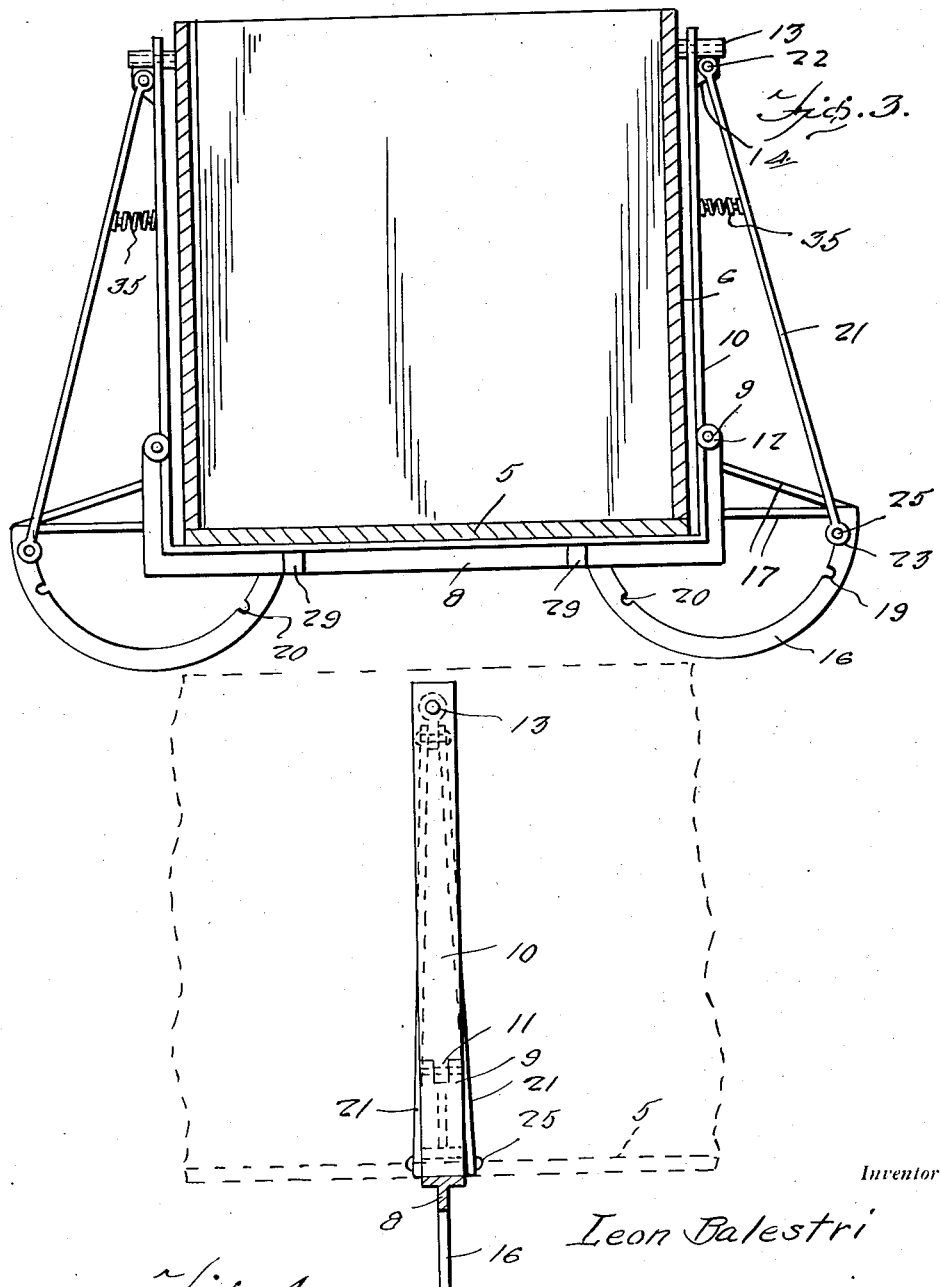

Oct. 13, 1942. L. BALESTRI 2,298,524
COMBINATION WAGON BOX
Filed June 27, 1941 5 Sheets-Sheet 3
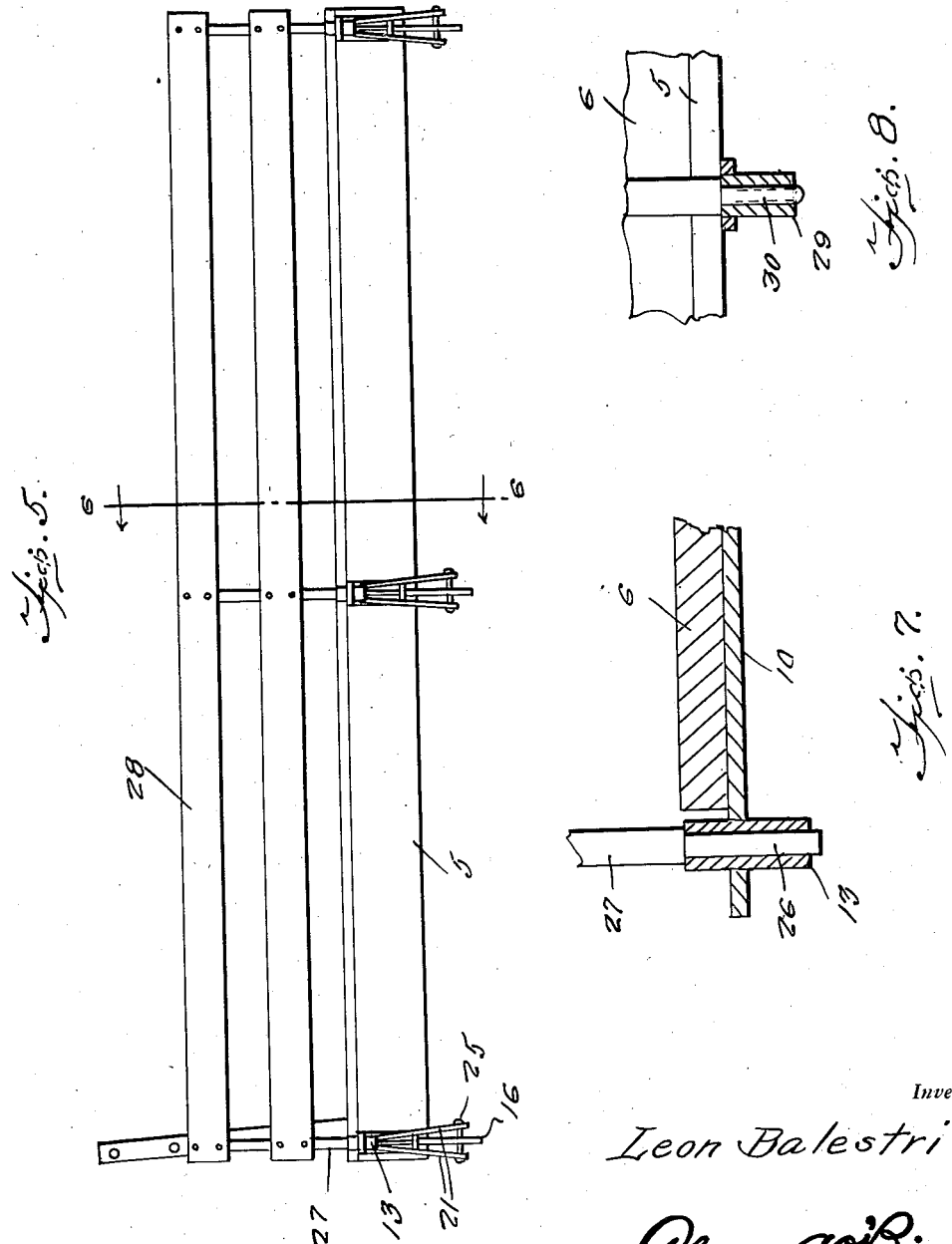
Inventor
*Leon Balestri*
By *Clarence A. O'Brien*
Attorney

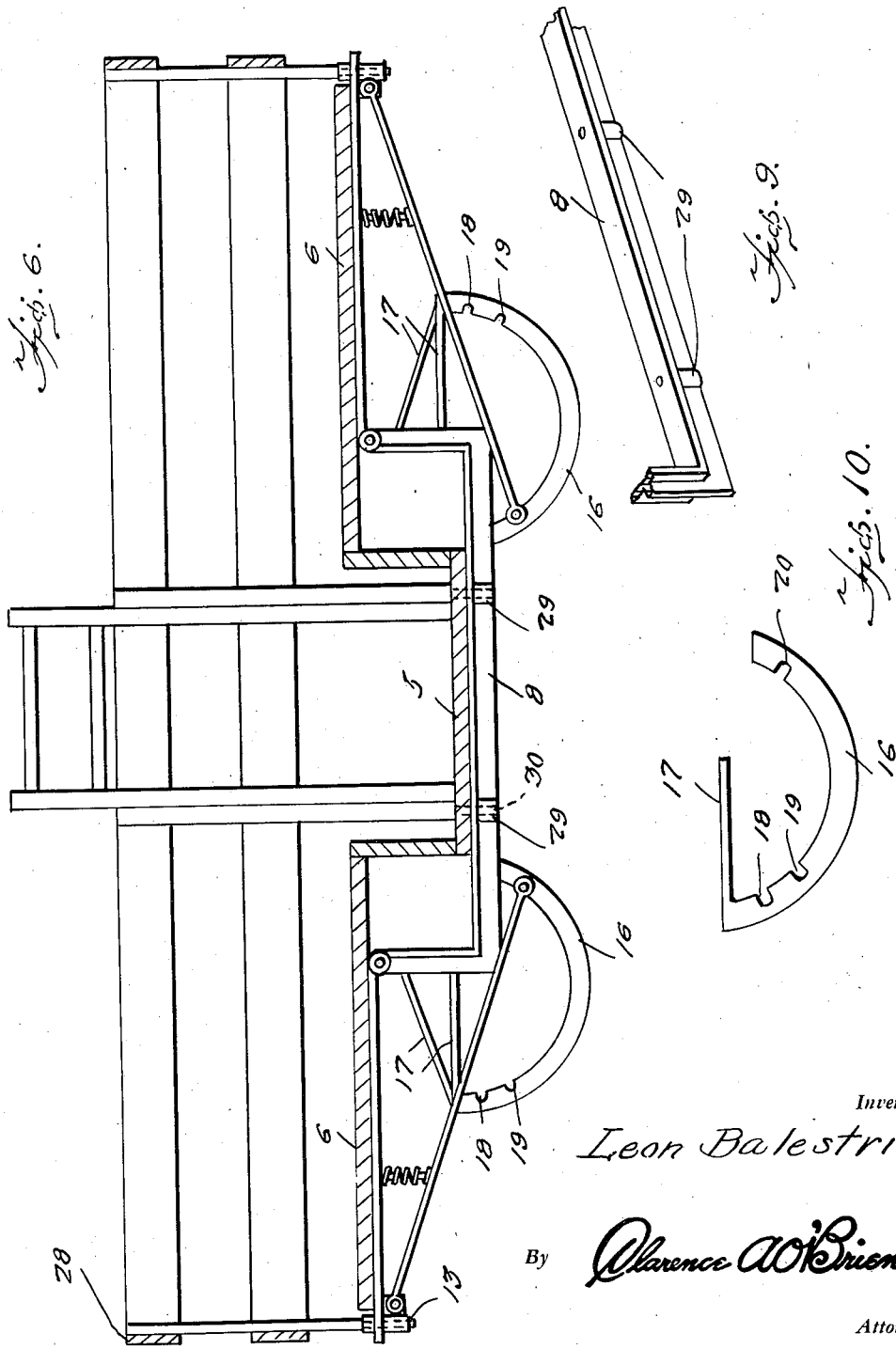

Oct. 13, 1942.   L. BALESTRI   2,298,524
COMBINATION WAGON BOX
Filed June 27, 1941   5 Sheets-Sheet 5
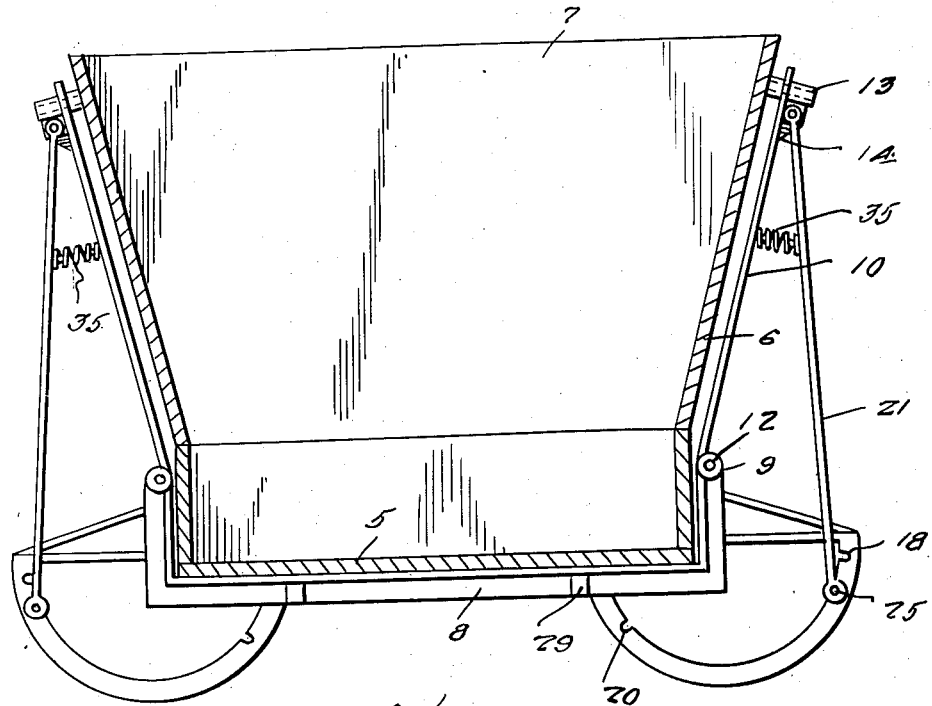
Fig. 11.
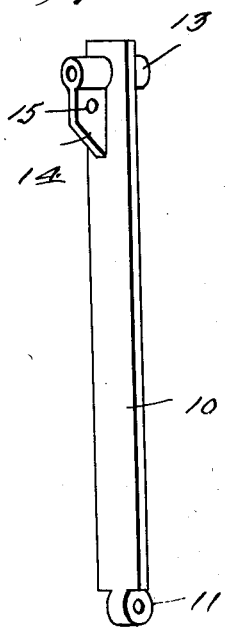
Fig. 12.
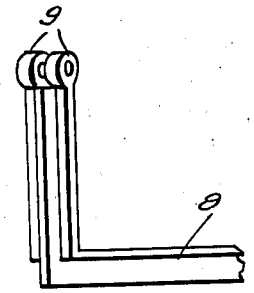
Fig. 13.
Fig. 14.
Inventor
Leon Balestri
By Clarence A. O'Brien
Attorney.

Patented Oct. 13, 1942

2,298,524

UNITED STATES PATENT OFFICE 2,298,524

COMBINATION WAGON BOX

Leon Balestri, Hennepin, Ill.

Application June 27, 1941, Serial No. 400,138

1 Claim. (Cl. 296—11)

This invention relates to new and useful improvements in farm wagons and more particularly to an improved combination wagon box and rack.

The principal object of the present invention is to provide a wagon box which can be quickly converted from a straight sided grain box to a flared side box or to a rack for hauling hay, straw, etc.

Other important objects and advantages of the invention will become apparent to the reader of the following specification.

In the drawings:

Figure 1 represents a side elevational view of the box adjusted to have vertical side walls.

Figure 2 is a top plan view of the structure shown in Figure 1.

Figure 3 is a vertical enlarged sectional view taken substantially on the line 3—3 of Figure 1.

Figure 4 is a vertical sectional view through the adjusting means.

Figure 5 is a side elevational view showing the box adjusted to define a hay rack.

Figure 6 is a vertical cross sectional view taken substantially on the line 6—6 of Figure 5.

Figure 7 is a fragmentary detailed sectional view through one of the socket structures for holding the slatted side wall of the rack.

Figure 8 is a fragmentary detailed sectional view showing the pin and socket structure between the box and the U-frames.

Figure 9 is a fragmentary perspective view of one of the U-frames.

Figure 10 is a side elevational view of one of the segmental racks.

Figure 11 is a vertical transverse sectional view through the box showing the side walls adjusted to a slanting position.

Figure 12 is a perspective view of one of the pivotal arms.

Figure 13 is a perspective view showing one end of one of the U-frames.

Figure 14 is a side elevational view of one of the connecting rods.

Referring to the drawings wherein like numerals designate like parts, it can be seen in Figures 3 and 11 that numeral 5 denotes a wagon box provided with upstanding side walls 6 and end walls 7. The purpose of the present invention is to hold the side wall 6 either in the vertical position shown in Figure 3 or slanting as shown in Figure 11, or drop to a horizontal plane as shown in Figure 6.

To permit these adjustments, two or more U-shaped frames 8 are disposed under the box 5 and each has hinged knuckles 9 at the upper ends thereof to which vertically disposed arms 10 are hingedly connected. The arms 10 each has a hinge knuckle 11 at its lower end for interlapping relation with the knuckles 9 and a pin 12 is disposed through these knuckles for hingedly connecting the arms 10 with the upper ends of the frames 8 as can be clearly seen in Figure 11.

A transverse tubular socket 13 is provided at the upper end of each of the arms 10 and a short web 14 connects one end portion of the socket 13 with the corresponding arm 10 in the manner shown in Figure 12, this web being apertured as at 15.

At each end portion of each frame 8 is an arcuate rack 16 which has its inner end connected to the lower portion of the frame 8 and its outer end connected by brace members 17 to the corresponding upstanding leg of the frame. The inner edge portion of the rack 16 has a pair of notches 18 and 19 adjacent its outer end and a notch 20 adjacent its inner end.

A pair of elongated connecting rods 21, 21 is provided for each of the racks 16 and each of these rods 21 has eyes 22 and 23 at the upper and lower ends thereof. A bolt or the like 24 extends through the upper eye 22 and the opening 15 in the web 14 to connect the tie rods with the upper portion of the corresponding arm 10, while the lower eyes 23 have a pin 25 disposed therethrough and this pin can be disposed into any one of the notches 18, 19 or 20, depending upon what position the side walls of the box are to be located.

When it is desired that the side walls 6 be in upright position as shown in Figure 3, the pins 25 are disposed in then otches 18. This is clearly shown in Figure 3. However, when it is desired that the side walls be disposed in a slanting position, the pins are dropped to the lower notches 19 and thus the side walls are held in a slanting position as shown in Figure 11.

When it is desired that the side walls be dropped so that the box can be used as a hay rack for carrying hay and straw, the side walls 6 are droped to the horizontal plane shown in Figure 6, and the pins 25 engaged into the innermost notches 20 of the rack 16. Thus the side wall 6 will be held in a horizontal position and the socket 13 will then be beyond the outer edges of the side walls 6 and in a vertical position.

With the tubular sockets 13 in vertical position as shown in Figure 6, these sockets can be used for receiving the reduced lower end portions 26 of stakes 27 which are connected by side slats 28, all as is clearly shown in Figures 5 and 7.

To hold the frames 8 in proper position, the frames 8 have sockets 29 therein for receiving pins 30 which depend from the bottom of the box 5. This is clearly shown in Figure 8.

Compression springs 35 are interposed between the arms 10 and the rods 21 for the purpose of holding the pins 25 in the notches 20.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a wagon structure, a box, a movable side wall on the box, an arcuate member secured to the box and projecting outwardly and upwardly therefrom, said arcuate member having recesses at the inner side thereof, an arm swingably mounted at its lower end adjacent the box structure side wall and against which the side wall is disposed, a connecting rod having its upper end pivotally secured to the upper end of the arm, an outstanding pin on the lower end of the rod adapted to selectively engage in the recesses, and a compression spring interposed between the connecting rod and the arm to force the lower end of the arm outwardly and hold the pin in a selected recess.

LEON BALESTRI.